No. 789,542. PATENTED MAY 9, 1905.
P. P. HEDENSTROM.
SHIFTING ATTACHMENT FOR VEHICLE SHAFTS.
APPLICATION FILED JULY 15, 1904.

WITNESSES:
D. E. Carlsen
E. C. Carlsen

INVENTOR.
Peter P. Hedenstrom.
BY his ATTORNEY:
A. M. Carlsen.

No. 789,542.

Patented May 9, 1905.

UNITED STATES PATENT OFFICE.

PETER P. HEDENSTROM, OF LAKEPARK, MINNESOTA.

SHIFTING ATTACHMENT FOR VEHICLE-SHAFTS.

SPECIFICATION forming part of Letters Patent No. 789,542, dated May 9, 1905.

Application filed July 15, 1904. Serial No. 216,750.

*To all whom it may concern:*

Be it known that I, PETER P. HEDENSTROM, a citizen of the United States, residing at Lakepark, in the county of Becker and State of Minnesota, have invented certain new and useful Improvements in Shifting Attachments for Vehicle-Shafts; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in shifting attachments for vehicle-shafts; and the main objects of the invention are, first, to provide means by which the shafts of a vehicle, and more especially of a buggy, may when so desired be shifted over to one side, so that the horse may walk in the track formed by one of the two horses when a team is used, and thus avoid the usually rough and unpleasant ridge formed in the middle of a wagon-road; second, to combine with such shifting device means for the prevention of side draft when the shafts are shifted to one side. These objects I attain by the novel construction and arrangement of parts illustrated in the accompanying drawings, in which—

Figure 1:
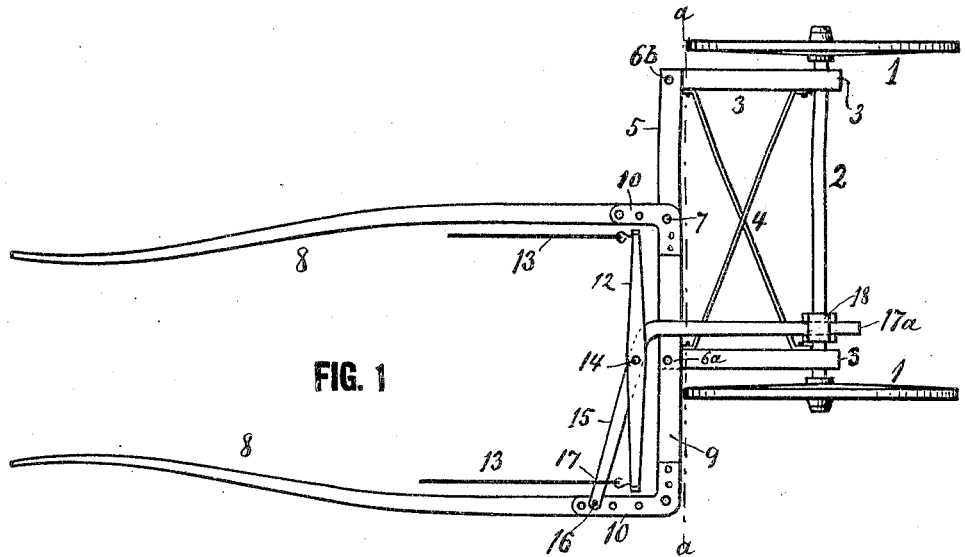
Figure 2:
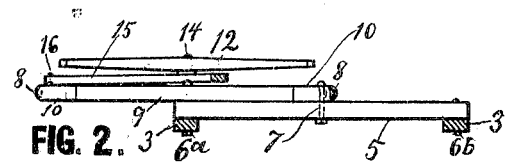
Figure 4:
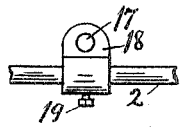
Figure 3:

Figure 1 is a top view of the front wheels and axle of a buggy and a pair of shafts attached thereto by my improved means and shifted to one side. Fig. 2 is a sectional view on the line *a a* in Fig. 1 looking forwardly or from right to left. Fig. 3 is a sectional view on the same line as Fig. 2, but with the shafts shifted back to the central and normal position and the anti-side-draft lever removed. Fig. 4 is a rear elevation of a portion of the axle of the vehicle.

Referring to the drawings by reference-numerals, 1 is a pair of front wheels, and 2 the front axle of a buggy or other one-horse vehicle. Upon or to said axle is secured by clips or in any suitable manner a frame made up of the hounds 3, braces 4, and front cross-bar 5, of which the ends are secured by two bolts 6ª 6ᵇ to the front ends of the hounds, while midway between said bolts is a bolt 7. The shafts 8 are firmly secured to the ends of a transferable cross-bar 9 by metallic elbow-pieces 10 or other suitable means.

When the shafts are in normal position, as in Fig. 3, the shaft-uniting bar or "shaft-bar" 9 is placed with its central hole upon the bolt 7, and the ends of the bar 9 are secured upon the bolts 6ª and 6ᵇ, so as to make the shafts firm with the frame 3 4 5.

13 represents the traces or tugs of the harness.

When the shafts are shifted to one side, as in Figs. 1 and 2, the bar 9 is secured with one of its end holes upon the bolt 7 and its central hole upon the bolt 6ª, while the whiffletree is placed upon a bolt 14, secured in or near the bend of a bell-crank lever 15, which has its forward end 17 pivoted at 16 to the outer shaft and its rear end 17ª slidingly inserted in a guide or bearing 18, secured upon the axle 2, as is best shown in Fig. 4, where the guide is held by a set-screw 19.

From the above description it will be understood that when the shafts are over to one side and the horse pulls at the tugs the angular lever 15 by being pulled slightly forward in the guide 18 tends to resist the inward tendency of the left side shaft, which is caused by the outward position of the right side wheel or wheels of the vehicle beyond the line in which the animal is pulling. It will also be understood that the frame 3 4 5 whether secured to the axle with thill-couplings or other means forms together with the shafts a stiff structure similar to a common pair of buggy-shafts. Finally, it will be understood that when the roads are such that the shafts may be used in their normal central position the lever 15 is removed and put aside until needed again, and the block or guide 18 may remain on the axle or be made in halves and bolted together, so that it may easily be removed and replaced.

I am aware that prior to my invention cutters have been provided with certain means for shifting the shafts to one side. I therefore do not claim such means, broadly; but

What I claim, and desire to secure by Letters Patent, is—

1. The combination with a wheeled vehicle, of a frame extending forwardly from the front axle, a pair of shafts united at their rear ends by a transverse bar, said bar being adjustable upon the frame so as to pull from the center or from one of its corners, a guide fixed upon the axle, an angular lever having one arm slidingly inserted in the guide and its other arm pivotally connected with the outer shaft when the shafts are in the lateral position, and a whiffletree pivotally secured upon said lever at or near the junction of its arms, substantially as and for the purposes set forth.

2. The combination with the front end of a vehicle, of a pair of shafts secured thereto in a lateral position, an angular lever pivoted with one arm to the outer shaft, a guide fixed on the vehicle and guiding the other arm of the lever so that it may slide in a longitudinal direction of the vehicle, and a whiffletree pivotally secured to said lever at or near the bend of the lever.

In testimony whereof I affix my signature in presence of two witnesses.

PETER P. HEDENSTROM.

Witnesses:
   CHARLES E. FOSS,
   PETER HANSON.